(12) United States Patent
Ishii et al.

(10) Patent No.: US 11,795,113 B2
(45) Date of Patent: Oct. 24, 2023

(54) CUBIC BORON NITRIDE SINTERED MATERIAL

(71) Applicants: SUMITOMO ELECTRIC INDUSTRIES, LTD., Osaka (JP); SUMITOMO ELECTRIC HARDMETAL CORP., Hyogo (JP)

(72) Inventors: Akito Ishii, Osaka (JP); Katsumi Okamura, Osaka (JP); Hisaya Hama, Hyogo (JP); Yuh Ishida, Hyogo (JP); Issei Nagashima, Hyogo (JP)

(73) Assignees: SUMITOMO ELECTRIC INDUSTRIES, LTD., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 17/947,627

(22) Filed: Sep. 19, 2022

(65) Prior Publication Data
US 2023/0027098 A1    Jan. 26, 2023

Related U.S. Application Data

(63) Continuation of application No. 17/611,143, filed as application No. PCT/JP2020/041222 on Nov. 4, 2020, now abandoned.

(51) Int. Cl.
*C04B 35/5831* (2006.01)
*C04B 35/64* (2006.01)

(52) U.S. Cl.
CPC .......... *C04B 35/5831* (2013.01); *C04B 35/64* (2013.01); *C04B 2235/386* (2013.01); *C04B 2235/3847* (2013.01); *C04B 2235/402* (2013.01); *C04B 2235/405* (2013.01); *C04B 2235/785* (2013.01); *C04B 2235/786* (2013.01); *C04B 2235/9607* (2013.01)

(58) Field of Classification Search
CPC .................................................. C04B 35/5831
See application file for complete search history.

(56) References Cited

U.S. PATENT DOCUMENTS

| | | |
|---|---|---|
| 7,524,785 B2 | 4/2009 | Matsukawa et al. |
| 8,999,531 B2 | 4/2015 | Kudoh et al. |
| 11,155,901 B2 | 10/2021 | Dkamura et al. |
| 2008/0214383 A1 | 9/2008 | Matsukawa et al. |
| 2013/0034712 A1 | 2/2013 | Kudoh et al. |
| 2021/0246078 A1 | 8/2021 | Okamura et al. |
| 2021/0246536 A1 | 8/2021 | Okamura et al. |
| 2021/0395153 A1 | 12/2021 | Ishii et al. |

FOREIGN PATENT DOCUMENTS

| | | |
|---|---|---|
| JP | 55-031517 A | 3/1980 |
| JP | 6744520 B1 | 8/2020 |
| WO | 2005/066381 A1 | 7/2005 |

OTHER PUBLICATIONS

Office Action dated Mar. 18, 2022 in related U.S. Appl. No. 17/611,143.

*Primary Examiner* — Karl E Group
(74) *Attorney, Agent, or Firm* — Renner, Otto, Boisselle & Sklar, LLP

(57) ABSTRACT

A cubic boron nitride sintered material includes: more than or equal to 80 volume % and less than or equal to 96 volume % of cubic boron nitride grains; and a binder, wherein the binder includes tungsten carbide, cobalt, and an aluminum compound, and Ha/Hb≥0.40 is satisfied, where Hb represents a hardness of the cubic boron nitride sintered material and Ha represents a hardness of the cubic boron nitride sintered material after performing acid treatment onto the cubic boron nitride sintered material to substantially remove the binder in the cubic boron nitride sintered material.

16 Claims, 2 Drawing Sheets

CUBIC BORON NITRIDE SINTERED MATERIAL

TECHNICAL FIELD

The present disclosure relates to a cubic boron nitride sintered material.

BACKGROUND ART

A cubic boron nitride sintered material (hereinafter, also referred to as "cBN sintered material") is a high-hardness material used for cutting tools and the like. The cubic boron nitride sintered material is normally constituted of cubic boron nitride grains (hereinafter, also referred to as "cBN grains") and a binder. Depending on a content ratio of the cubic boron nitride grains, characteristics of the cBN sintered material tend to differ.

Hence, in the field of cutting, different types of cubic boron nitride sintered materials are applied to cutting tools in accordance with the material of a workpiece, required precision in processing, or the like. For example, a cubic boron nitride sintered material (hereinafter, also referred to as a "high-cBN sintered material") having a high content ratio of cubic boron nitride (hereinafter, also referred to as "cBN") grains can be suitably used for cutting of a sintered alloy or the like.

However, the high-cBN sintered material tends to be likely to be sporadically chipped. Such sporadic chipping is considered to be caused due to the following reason: binding strength between the cubic boron nitride grains is weak to result in falling of the cubic boron nitride grains. For example, WO 2005/066381 (PTL 1) discloses a technique of suppressing occurrence of sporadic chipping in a high-cBN sintered material by appropriately selecting a binder.

CITATION LIST

Patent Literature

PTL 1: WO 2005/066381

SUMMARY OF INVENTION

A cubic boron nitride sintered material according to the present disclosure is a cubic boron nitride sintered material including:
more than or equal to 80 volume % and less than or equal to 96 volume % of cubic boron nitride grains; and
a binder, wherein
the binder includes tungsten carbide, cobalt, and an aluminum compound, and
$Ha/Hb \geq 0.40$ is satisfied, where Hb represents a hardness of the cubic boron nitride sintered material and Ha represents a hardness of the cubic boron nitride sintered material after performing acid treatment onto the cubic boron nitride sintered material to substantially remove the binder in the cubic boron nitride sintered material.

DETAILED DESCRIPTION

Figure 1:
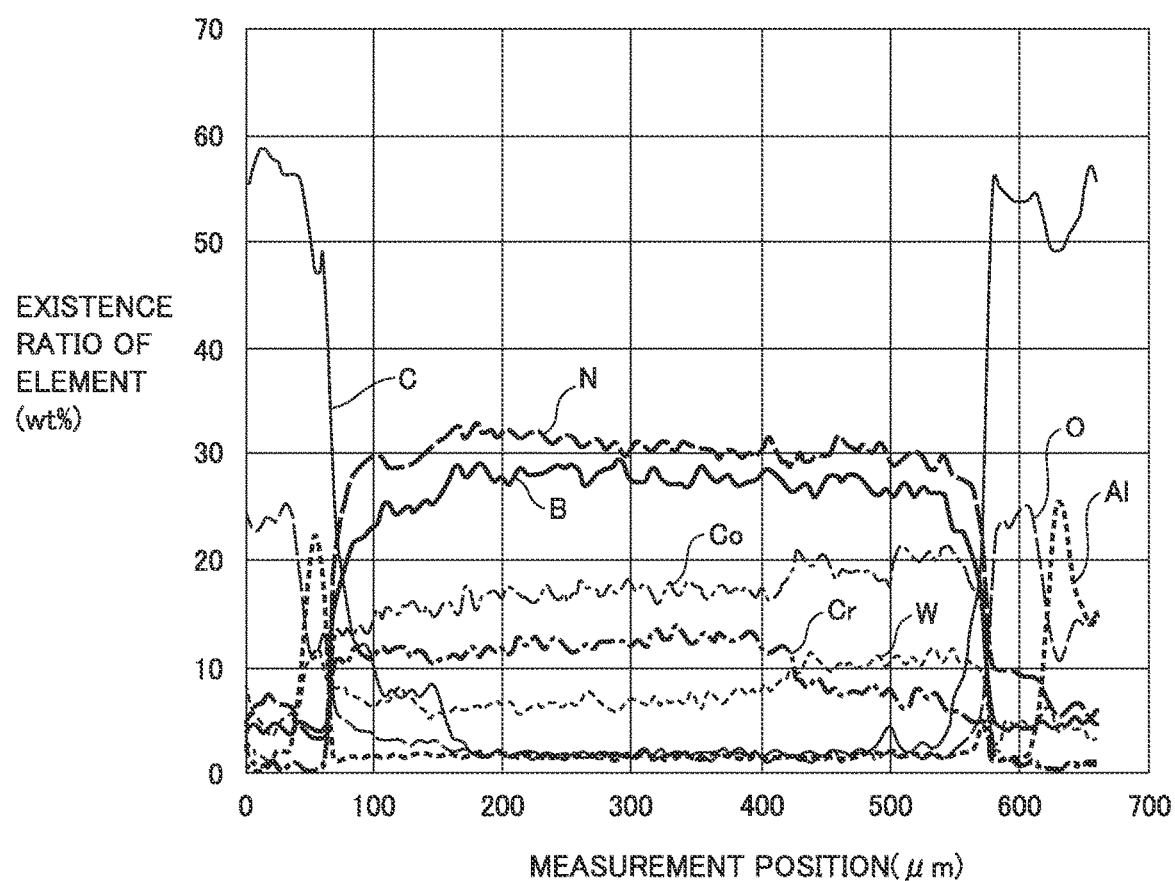
FIG. 1 is a diagram showing an exemplary SEM-EDS analysis result of a cubic boron nitride sintered material (before acid treatment) according to the present disclosure.

Problem to be Solved by the Present Disclosure

In recent years, due to rapid improvement in functions of mechanical parts, it becomes more difficult to cut workpieces to serve as the mechanical parts. This leads to a short life of a cutting tool, thus apparently resulting in increased cost, disadvantageously. Therefore, further improvement of a high-cBN sintered material has been desired. In view of this, the present disclosure has an object to provide a cubic boron nitride sintered material that attains a long life of a tool when used as a tool material.

Advantageous Effect of the Present Disclosure

A tool using the cubic boron nitride sintered material according to the present disclosure can have a long tool life.

DESCRIPTION OF EMBODIMENTS

In order to complete a cubic boron nitride sintered material that attains a long life, the present inventors first have decided to use a binder source material powder including WC (tungsten carbide), Co (cobalt), and Al (aluminum) as a source material of a binder in a high-cBN sintered material. This is because the present inventors have obtained the following knowledge in previous research: when such a binder source material powder is used, the binder has a particularly high binding strength with respect to cubic boron nitride grains, with the result that a cubic boron nitride sintered material having excellent wear resistance and breakage resistance can be obtained.

However, in the high-cBN sintered material, the amount of the binder is significantly smaller than the amount of the cubic boron nitride grains. Hence, the binder tends to be less likely to be distributed widely between the cubic boron nitride grains. Therefore, the present inventors have considered that any breakthrough for attaining a long life of the high-cBN sintered material cannot be achieved only by optimizing the binder.

Therefore, from a greatly different point of view, the present inventors have sought for a technique of increasing binding strength between the cubic boron nitride grains, unlike the conventional technique of increasing binding strength between the binder and each of the cubic boron nitride grains. As a result of diligent study, the cubic boron nitride sintered material according to the present disclosure was obtained.

The present disclosure has been completed in the manner described above. Hereinafter, embodiments of the present disclosure will be listed and described.

(1) A cubic boron nitride sintered material according to the present disclosure is a cubic boron nitride sintered material including:
more than or equal to 80 volume % and less than or equal to 96 volume % of cubic boron nitride grains; and
a binder, wherein
the binder includes tungsten carbide, cobalt, and an aluminum compound, and
$Ha/Hb \geq 0.40$ is satisfied, where Hb represents a hardness of the cubic boron nitride sintered material and Ha represents a hardness of the cubic boron nitride sintered material after performing acid treatment onto the cubic boron nitride sintered material to substantially remove the binder in the cubic boron nitride sintered material.

When the cubic boron nitride sintered material according to the present disclosure is used as a tool material the life of the tool can be made long.

(2) Preferably, Ha and Hb satisfy Ha/Hb≥0.53. Accordingly, the tool life is improved.

(3) Preferably, Ha and Hb satisfy Ha/Hb≥0.55. Accordingly, the tool life is more improved.

(4) Preferably, Ka/Kb≥0.60 is satisfied, where Kb represents a thermal diffusivity of the cubic boron nitride sintered material before the acid treatment, and Ka represents a thermal diffusivity of the cubic boron nitride sintered material after the acid treatment. Accordingly, the tool life is more improved.

(5) Preferably, Ka and Kb satisfy Ka/Kb≥0.90. Accordingly, the tool life is more improved.

(6) Preferably, Ka and Kb satisfy Ka/Kb≥0.95. Accordingly, the tool life is more improved.

(7) Preferably, Ta/Tb≥0.30 is satisfied, where Tb represents a bending test strength of the cubic boron nitride sintered material before the acid treatment and Ta represents a bending test strength of the cubic boron nitride sintered material after the acid treatment. Accordingly, the tool life is more improved.

(8) Preferably, Ta and Tb satisfy Ta/Tb≥0.35. Accordingly, the tool life is more improved.

(9) Preferably, Ta and Tb satisfy Ta/Tb≥0.40. Accordingly, the tool life is more improved.

(10) An average grain size of the cubic boron nitride is preferably more than or equal to 0.4 μm and less than or equal to 5 μm. Accordingly, the tool life is more improved.

(11) The average grain size of the cubic boron nitride is preferably more than or equal to 0.5 μm and less than or equal to 3.5 μm. Accordingly, the tool life is more improved.

Details of Embodiments of the Present Disclosure

The following describes one embodiment (hereinafter, referred to as "the present embodiment") of the present disclosure. However, the present embodiment is not limited thereto. It should be noted that in the present specification, the expression "A to Z" represents a range of lower to upper limits (i.e., more than or equal to A and less than or equal to Z). When no unit is indicated for A and a unit is indicated only for Z, the unit of A is the same as the unit of Z.

First Embodiment: Cubic Boron Nitride Sintered Material

A cubic boron nitride sintered material according to the present embodiment is a cubic boron nitride sintered material including:

more than or equal to 80 volume % and less than or equal to 96 volume % of cubic boron nitride grains; and a binder, wherein the binder includes tungsten carbide, cobalt, and an aluminum compound, and Ha/Hb≥0.40 is satisfied, where Hb represents a hardness of the cubic boron nitride sintered material and Ha represents a hardness of the cubic boron nitride sintered material after performing acid treatment onto the cubic boron nitride sintered material to substantially remove the binder in the cubic boron nitride sintered material.

When the cubic boron nitride sintered material according to the present embodiment is used as a tool material, the life of the tool can be made long. This is presumably due to the following reasons (i) to (iii).

(i) The cubic boron nitride sintered material according to the present embodiment includes more than or equal to 80 volume % and less than or equal to 96 volume % of the cubic boron nitride grains each having excellent strength and toughness. Therefore, the cubic boron nitride sintered material can also have excellent strength and toughness. Accordingly, the cubic boron nitride sintered material has excellent wear resistance and breakage resistance, and a tool using the cubic boron nitride sintered material can have a long tool life.

(ii) In the cubic boron nitride sintered material according to the present embodiment, the binder includes tungsten carbide, cobalt, and an aluminum compound. Such a binder has a particularly high binding force with respect to the cubic boron nitride grains. Accordingly, the cubic boron nitride sintered material has excellent wear resistance and breakage resistance, and a tool using the cubic boron nitride sintered material can have a long tool life.

(iii) In the cubic boron nitride sintered material according to the present embodiment, Ha/Hb≥0.40 is satisfied, where Hb represents a hardness of the cubic boron nitride sintered material and Ha represents a hardness of the cubic boron nitride sintered material after performing acid treatment onto the cubic boron nitride sintered material to substantially remove the binder in the cubic boron nitride sintered material. In such a cubic boron nitride sintered material, binding force between the cubic boron nitride grains is high. Therefore, in the cubic boron nitride sintered material, the cubic boron nitride grains are less likely to fall during use of a tool. The cubic boron nitride sintered material has excellent wear resistance and breakage resistance, and the tool using the cubic boron nitride sintered material can have a long tool life.

(Composition)

Specifically, the cubic boron nitride sintered material according to the present embodiment includes: more than or equal to 80 volume % and less than or equal to 96 volume % of the cubic boron nitride grains; and the binder. That is, the cubic boron nitride sintered material according to the present embodiment is a so-called high-cBN sintered material. It should be noted that the cubic boron nitride sintered material may include an inevitable impurity resulting from a source material used herein, a production condition, or the like. The content ratio (mass %) of the inevitable impurity in the cubic boron nitride sintered material can be less than or equal to 1 mass %. The cubic boron nitride sintered material according to the present embodiment can consist of the cubic boron nitride grains, the binder, and the inevitable impurity.

The lower limit of the content ratio (volume %) of the cubic boron nitride grains in the cubic boron nitride sintered material is more than or equal to 80 volume % and can be more than or equal to 81 volume % or can be more than or equal to 82 volume %. The upper limit of the content ratio (volume %) of the cubic boron nitride grains in the cubic boron nitride sintered material is less than or equal to 96 volume %, and can be less than or equal to 95 volume % or can be less than or equal to 94 volume %. The content ratio (volume %) of the cubic boron nitride grains in the cubic boron nitride sintered material can be more than or equal to 81 volume % and less than or equal to 95 volume %, or can be more than or equal to 82 volume % and less than or equal to 94 volume %.

The lower limit of the content ratio (volume %) of the binder in the cubic boron nitride sintered material can be more than or equal to 4 volume %, can be more than or equal to 5 volume %, or can be more than or equal to 6 volume %.

The upper limit of the content ratio (volume %) of the binder in the cubic boron nitride sintered material can be less than or equal to 20 volume %, can be less than or equal to 19 volume %, car can be less than or equal to 18 volume %. The content ratio volume %) of the binder in the cubic boron nitride sintered material can be more than or equal to 4 volume % and less than or equal to 20 volume %, can be more than or equal to 5 volume % and less than or equal to 19 volume %, or can be more than or equal to 6 volume %, and less than or equal to 18 volume %.

The content ratio (volume %) of the cubic boron nitride in the cubic boron nitride sintered material can be confirmed by performing quantitative analysis through inductively coupled high-frequency plasma spectrometry (ICP), or by performing structure observation, element analysis, or the like onto the cubic boron nitride sintered material using an energy dispersive X-ray analyzer (EDX) accompanied with a scanning electron microscope (SEM) or an EDX accompanied with a transmission electron microscope (TEM). In the present embodiment, unless otherwise specified, the content ratio of the cubic boron nitride grains in the cubic boron nitride sintered material is determined by a below-described method using SEM.

When the SEM is used, the content ratio (volume %) of the cubic boron nitride grains can be determined as follows. First, the cubic boron nitride sintered material is cut at an arbitrary position to form a sample including a cross section of the cubic boron nitride sintered material. For the formation of the cross section, a focused ion beam device, a cross section polisher device, or the like can be used. Next, the cross section is observed by the SEM at a magnification of 2000× to obtain a reflected electron image. In the reflected electron image, a black region represents a region in which the cubic boron nitride grains exist and a gray or white region represents a region in which the binder exists. The magnification for observation is appropriately adjusted in accordance with the grain sizes. The average value of content ratios in five or more observed and analyzed visual fields is regarded as the content ratio.

Next, the reflected electron image is subjected to binarization processing using image analysis software (for example, "WinROOF" provided by Mitani Corporation), and each of the area ratios of the black region (region in which the cubic boron nitride grains exist) and the white region (region in which the binder phase exists) is calculated from the image having been through the binarization processing. The calculated area ratio is regarded as volume %, thereby finding the content ratio (volume %) of the cubic boron nitride grains. It should be noted that with this, the volume % of the binder can be found at the same time.

(Cubic Boron Nitride Grains)

The cubic boron nitride grains have high hardness, high strength, and high toughness, and serves as a base of the cubic boron nitride sintered material. In order to improve the tool life, D50 of the cubic boron nitride grains (average grain size) is preferably more than or equal to 0.4 µm and less than or equal to 5 µm, and is more preferably more than or equal to 0.5 µm and less than or equal to 3.5 µm.

D50 of the cubic boron nitride grains is determined as follows. First, a sample including a cross section of the cubic boron nitride sintered material is formed in a manner similar to that in the above-described method of finding the content of the cubic boron nitride grains, and a reflected electron image is obtained. Next, the equivalent circle diameter of each black region (the diameter of the circle having the same area as the area of each black region) in the reflected electron image is calculated using image analysis software. It is preferable to calculate the equivalent circle diameters of 100 or more cubic boron nitride grains by performing observation in five or more visual fields.

Next, the equivalent circle diameters are arranged in an ascending order from the minimum value to the maximum value to find a cumulative distribution. D50 represents a grain size corresponding to a cumulative area of 50% in the cumulative distribution. It should be noted that the equivalent circle diameter refers to the diameter of a circle having the same area as the area of the measured cubic boron nitride grain.

(Binder)

The binder serves to sinter cubic boron nitride particles at industrial levels of pressure and temperature. Each of the cubic boron nitride particles is a difficult-to-be-sintered material.

In the cubic boron nitride sintered material according to the present embodiment, the binder includes WC, Co and an Al compound, Here, the "Al compound" refers to a compound including Al as a constituent element. Examples of the Al compound include CoAl, $Al_2O_3$, AlN, $AlB_2$, composite compounds thereof, and the like. Due to the following reasons, the binder including WC, Co and the Al compound is considered to be particularly effective in attaining a long life of the cubic boron nitride sintered material according to the present embodiment.

First, since each of Co and Al has a catalyst function, neck growth between the cubic boron nitride grains can be promoted in a sintering step during production of the cubic boron nitride sintered material. Second, WC is presumed to be effective in providing the binder with a thermal expansion coefficient close to the thermal expansion coefficient of the cubic boron nitride grains. It should be noted that the catalyst function means that B (boron) and/or N (nitrogen) of the cubic boron nitride grains is diffused or precipitated by way of Co or Al. Third, the metal component such as Co serves to improve toughness, and an appropriate amount of the binder leads to improved breakage resistance.

The composition of the binder included in the cubic boron nitride sintered material can be specified by combining XRD (X-ray diffraction measurement) and ICP. Specifically, first, a specimen having a thickness of about 0.45 to 0.50 mm is cut from the cubic boron nitride sintered material, and XRD analysis is performed onto the specimen to determine a compound, a metal, or the like based on an X-ray diffraction peak. Next, the specimen is immersed in hydrofluoric-nitric acid (acid mixture with concentrated nitric acid (60%): distilled water:concentrated hydrofluoric acid (47%)=2:2:1 at a volume ratio) within a sealed container, thereby obtaining an acid-treated solution having the binder dissolved therein. The acid-treated solution is subjected to ICP analysis to perform quantitative analysis for each metal element. The composition of the binder is determined by analyzing the results of XRD and ICP analysis.

The binder in the present embodiment may include other binder(s) in addition to WC, Co, and the Al compound. Suitable examples of the element(s) of the other binder(s) include Ni, Fe, Cr, Mn, Ti, V, Zr, Nb, Mo, Hf, Ta, Re, and the like.

(Hardness)

In the cubic boron nitride sintered material according to the present embodiment, $Ha/Hb \geq 0.40$ is satisfied, where Hb represents a hardness of the cubic boron nitride sintered material before acid treatment and Ha represents a hardness of the cubic boron nitride sintered material after performing the acid treatment onto the cubic boron nitride sintered material to substantially remove the binder in the cubic boron nitride sintered material. Here, hardness Hb (GPa) of the cubic boron nitride sintered material before the acid treatment is measured in the following procedure. The cubic boron nitride sintered material is processed to a thickness of 0.5 mm, thereby preparing a measurement sample A. The hardness of measurement sample A (the cubic boron nitride sintered material before the acid treatment) is measured under a load of 5 kg using a load-cell microhardness/Vickers hardness tester manufactured by FUTURE-TECH. The measurement of the hardness is performed at six locations, and the average value of the hardnesses at the six locations is defined as hardness Hb of the cubic boron nitride sintered material before the acid treatment.

Hardness Ha of the cubic boron nitride sintered material after the acid treatment is measured in the following procedure. An acid solution is prepared in which hydrochloric acid (95%), nitric acid (95%), fluoric acid (95%) and water are blended at a volume ratio of 2:1:1:2. Measurement sample A is introduced into the acid solution heated to 140° C. and is subjected to the acid treatment in a sealed container for 48 hours. Measurement sample B (cubic boron nitride sintered material) after the acid treatment is removed from the acid solution. The hardness of measurement sample B after the acid treatment is measured at six locations in the same manner as hardness Hb of the cubic boron nitride sintered material before the acid treatment. The average hardness thereof at the six locations is defined as hardness Ha of the cubic boron nitride sintered material after the acid treatment.

It should be noted that in the measurement performed by the Applicant, as long as the measurement is performed in the same sample, results of measurement were not substantially varied even when measurement locations for hardness Ha and hardness Hb were changed and the measurement was performed multiple times. It was confirmed that the results of measurement are not intentional even when a measurement location is set arbitrarily.

Although the binder of the cubic boron nitride sintered material can be substantially removed by the acid treatment, a binder component may remain even after the acid treatment. This is presumably due to the following reason. That is, the acid treatment is a method of introducing the cBN sintered material into the acid solution. Therefore, it is considered that when a plurality of cBN grains form, in the cBN sintered material, a region into which the acid solution cannot permeate (also referred to as "triple point"), the binder component remains after the acid treatment. Also, it is considered that when a substance, such as aluminum oxide, insoluble to the acid solution exists in the cBN sintered material, the binder component remains after the acid treatment. Therefore, when a sufficient amount of the binder for evaluation on the binding force between the cBN grains can be removed, it can be evaluated that the binder of the cubic boron nitride sintered material is substantially removed.

Whether or not the binder of the cubic boron nitride sintered material is substantially removed by the acid treatment can be confirmed in the following procedure. A surface of measurement sample A (the cBN sintered material before the acid treatment) is polished (#2000) for the sake of observation with a SEM (device: "JSM-7800F" (trademark) manufactured by JEOL). A line scan is performed using the SEM so as to include the center of the measurement surface. The width of the line is more than or equal to 100 μm. When the width of the line is more than or equal to 100 μm, imbalance of the cBN grains and the binder in the measurement region can be reduced.

Figure 2:
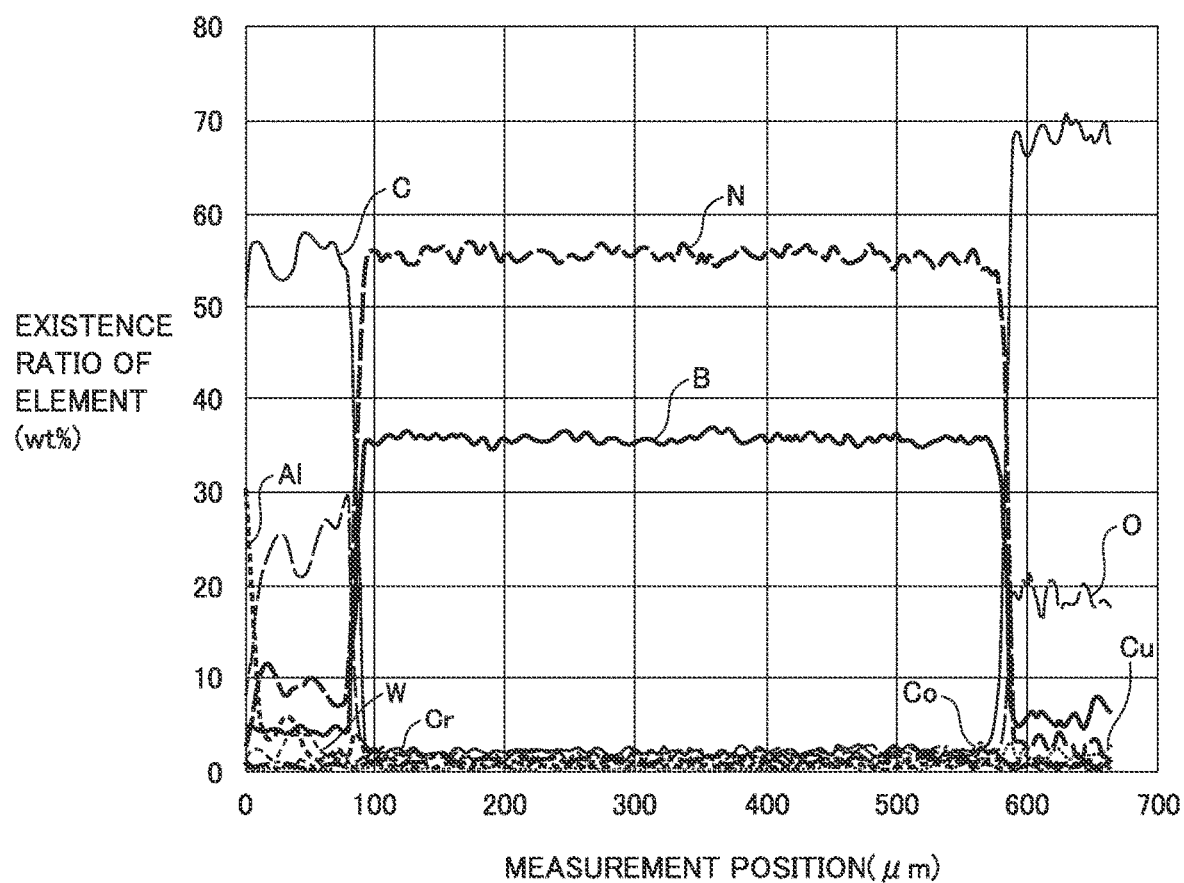
FIG. 2 is a diagram showing an exemplary SEM-EDS analysis result of the cubic boron nitride sintered material according to the present disclosure after the acid treatment.

Exemplary results of SEM-EDS analyses on the cubic boron nitride sintered material according to the present embodiment before and after the acid treatment are shown in FIG. 1 (before the acid treatment) and FIG. 2 (after the acid treatment). In each of FIGS. 1 and 2, the horizontal axis represents a measurement position (μm) in the sample, whereas the vertical axis represents an existence ratio (wt %) of each of elements. As shown in FIGS. 1 and 2, in the cubic boron nitride sintered material, existence of each of Al (aluminum), W (tungsten), Cr (chromium), Co (cobalt), B (boron), and N (nitrogen) is confirmed. Among these elements, carbon and nitrogen are originated from the cubic boron nitride grains. Tungsten aluminum, chromium and cobalt other than carbon and nitrogen are originated from the binder phase.

As shown in FIG. 2, after the acid treatment, the respective existence ratios of all the elements (in FIG. 2, W (tungsten), Al (aluminum), Cr (chromium), and Co (cobalt)) other than N (nitrogen) and B (boron) in the cubic boron nitride sintered material are decreased. This is because the binder component of the cubic boron nitride sintered material is eluted into the acid-treated solution when the acid treatment is performed.

In the above-described line scan, the existence ratio (mass %) of cobalt (Cb) in the cubic boron nitride sintered material is calculated. Specifically, average value X1 (mass %) of the existence ratios (mass %) of cobalt (Co) in the regions for the analysis on the cubic boron nitride sintered material is calculated. The regions for the analysis on the cubic boron nitride sintered material are specified in accordance with such a fact that the total of the existence ratios (at %) of boron and nitrogen, which are constituent elements of cubic boron nitride, is larger than the other binder components.

Next, measurement sample B (the cBN sintered material after the acid treatment) is subjected to the line scan using the SEM in the same manner as in measurement sample A. In the line scan, the existence ratio (mass %) of cobalt (Cb) in the cubic boron nitride sintered material is calculated. Specifically, average value X2 (mass %) of the existence ratios of cobalt (Co) in the regions for the analysis on the cubic boron nitride sintered material is measured. The regions for the analysis on the cubic boron nitride sintered material are specified in accordance with such a fact that the total of the existence ratios (at %) of boron and nitrogen, which are constituent elements of cubic boron nitride, is larger than the other binder components.

When X2/X1 is less than or equal to 0.20, it is confirmed that the binder of the cubic boron nitride sintered material has been substantially removed by the acid treatment. Therefore, the measurement of the hardness of the cBN sintered material, in which X2/X1 is less than or equal to 0.20, after the acid treatment corresponds to measurement of binding force between the cBN grains.

It should be noted that when X2/X1 is more than 0.20, X2/X1 can be less than or equal to 0.20 by appropriately adjusting a time of the acid treatment to be more than 48 hours.

In the cubic boron nitride sintered material in which Ha/Hb≥0.40 is satisfied, a hardness decrease ratio is small even after the acid treatment. When the acid treatment is performed, the binder component of the cubic boron nitride sintered material is eluted into the acid-treated solution. Therefore, the small hardness decrease ratio of the cubic boron nitride sintered material after the acid treatment indicates that the binding force between the cubic boron nitride grains is strong. Therefore, in the cubic boron nitride sintered material, the cubic boron nitride grains are less likely to fall during use of the tool. The cubic boron nitride sintered material has excellent wear resistance and breakage resistance, and the tool using the cubic boron nitride sintered material can have a long tool life.

For example, when a sintered alloy is processed by using a conventional cubic boron nitride sintered material, the cubic boron nitride grains are likely to fall during the processing to cause a blunt shape of the cutting edge, with the result that burrs and white turbidity tend to occur in the processed part. In the cubic boron nitride sintered material according to the present embodiment, since the binding force between the cubic boron nitride grains is strong and the cubic boron nitride grains are less likely to fall as described above, surface quality of the processed workpiece can be excellent.

Ha/Hb satisfies Ha/Hb≥0.40, preferably satisfies Ha/Hb≥0.53, and more preferably satisfies Ha/Hb≥0.55. The upper limit of Ha/Hb can be less than or equal to 1, for example. Ha/Hb can satisfy 1≥Ha/Hb≥0.40, 1≥Ha/Hb≥0.53, or 1≥Ha/Hb≥0.55.

Ha can be more than or equal to 14 GPa and less than or equal to 24 GPa, can be more than or equal to 15 GPa and less than or equal to 23 GPa, or can be more than or equal to 16 GPa and less than or equal to 24 GPa, for example.

Hb can be more than or equal to 34 GPa and less than or equal to 45 GPa, can be more than or equal to 35 GPa and less than or equal to 44 GPa, or can be more than or equal to 37 GPa and less than or equal to 43 GPa for example.

(Thermal Diffusivity)

In the cubic boron nitride sintered material according to the present embodiment, Ka/Kb≥0.60 is preferably satisfied, where Kb represents a thermal diffusivity of the cubic boron nitride sintered material before the acid treatment, and Ka represents a thermal diffusivity of the cubic boron nitride sintered material after performing the acid treatment onto the cubic boron nitride sintered material to substantially remove the binder in the cubic boron nitride sintered material. Here thermal diffusivity Kb ($mm^2/s$) of the cubic boron nitride sintered material before the acid treatment is measured in the following manner: the cubic boron nitride sintered material is cut into an isosceles triangle having a bottom side of 3.9 mm, an apex angle of 80°, and a thickness of 0.5 mm so as to prepare a measurement sample C; and measurement is performed onto measurement sample C using a xenon flash analyzer (LFA467 HyperFlash (trademark)) manufactured by NETZSCH.

Thermal diffusivity Ka ($mm^2/s$) of the cubic boron nitride sintered material after the acid treatment is measured in the following procedure. Measurement sample C is subjected to the acid treatment so as to form a measurement sample D (cubic boron nitride sintered material) having been through the acid treatment, and thermal diffusivity Ka ($mm^2/s$) thereof is measured by the device used in the measurement of measurement sample C. A specific method of the acid treatment is the same as the above-described method in the measurement of the hardness, and therefore will not be described repeatedly.

In the cubic boron nitride sintered material in which Ka/Kb≥0.60 is satisfied, a thermal diffusivity decrease ratio is small even after the acid treatment. This indicates that thermal conductivity between the cubic boron nitride grains is excellent. When a tool using the cubic boron nitride sintered material is particularly used for processing of cast iron, damage due to thermal cracking is reduced, thereby attaining a long tool life.

Ka/Kb preferably satisfies Ka/Kb≥0.60, more preferably satisfies Ka/Kb≥0.90, and further preferably satisfies Ka/Kb≥0.95. The upper limit of Ka/Kb can be less than or equal to 1, for example. Ka/Kb can satisfy 1≥Ka/Kb≥0.60, 1≥Ka/Kb≥0.90, or 1≥Ka/Kb≥0.95.

Ka can be more than or equal to 20 $mm^2/s$ and less than or equal to 62 $mm^2/s$, can be more than or equal to 30 $mm^2/s$ and less than or equal to 60 $mm^2/s$, or can be more than or equal to 40 $mm^2/s$ and less than or equal to 58 $mm^2/s$, for example.

Kb can be more than or equal to 39 $mm^2/s$ and less than or equal to 65 $mm^2/s$, can be more than or equal to 42 $mm^2/s$ and less than or equal to 62 $mm^2/s$, or can be more than or equal to 50 $mm^2/s$ and less than or equal to 60 $mm^2/s$, for example.

(Bending Test Strength)

In the cubic boron nitride sintered material according to the present embodiment, Ta/Tb≥0.30 is preferably satisfied, where Tb represents a bending test strength of the cubic boron nitride sintered material before the acid treatment and Ta represents a bending test strength of the cubic boron nitride sintered material after performing the acid treatment onto the cubic boron nitride sintered material to substantially remove the binder in the cubic boron nitride sintered material. Here, bending test strength (GPa) of the cubic boron nitride sintered material before the acid treatment is measured in the following manner: the cubic boron nitride sintered material is cut into a form of a plate of 0.5 mm×2 mm×5.8 mm so as to prepare a measurement sample E; and the bending test strength (GPa) of measurement sample E is measured using a three-point bending tester under conditions of a span of 4 mm and a stroke speed of 0.5 mm/min. The average value of the bending test strengths of ten measurement samples E is defined as bending test strength Tb (GPa) of the cubic boron nitride sintered material.

Bending test strength Ta (GPa) of the cubic boron nitride sintered material after the acid treatment is measured in the following procedure. Measurement sample E is subjected to the acid treatment so as to form a measurement sample F (cubic boron nitride sintered material) having been through the acid treatment, and the bending test strength of measurement sample F is measured using a three-point bending tester under conditions of a span of 4 mm and a stroke speed of 0.5 mm/min. The average value of the bending test strengths of ten measurement samples F is defined as bending test strength Ta (GPa) of the cubic boron nitride sintered material after the acid treatment. A specific method of the acid treatment is the same as the method in the above-described measurement of the hardness, and therefore will not be described repeatedly.

In the cubic boron nitride sintered material in which Ta/Tb≥0.30 is satisfied, a bending strength decrease ratio is small even after the acid treatment. This indicates that binding force between the cubic boron nitride grains is strong. Hence, the cubic boron nitride sintered material also exhibits excellent breakage resistance particularly in the case of processing of a high-strength sintered alloy.

Ta/Tb preferably satisfies Ta/Tb≥0.30, more preferably satisfies Ta/Tb≥0.35, and further preferably satisfies Ta/Tb≥0.40. The upper limit of Ta/Tb may be less than or equal to 1, for example. Ta/Tb can satisfy 1≥Ta/Tb≥0.30, 1≥Ta/Tb≥0.35, or 1≥Ta/Tb≥0.40.

Ta can be Inure than or equal to 0.35 GPa and less than or equal to 1.2 GPa, can be more than or equal to 0.5 GPa and less than or equal to 1.1 GPa, or can be more than or equal to 0.65 GPa and less than or equal to 1.0 GPa for example.

Tb can be more than or equal to 1.2 GPa and less than or equal to 3.0 GPa, can be more than or equal to 1.5 GPa and less than or equal to 2.7 GPa, or can be more than or equal to 1.7 GPa and less than or equal to 2.5 GPa, for example.

Second Embodiment: Method of Producing Cubic Boron Nitride Sintered Material

A method of producing the cubic boron nitride sintered material of the first embodiment will be described. However, the method of producing the cubic boron nitride sintered material is not limited to the below-described method. For example, the method of producing the cubic boron nitride sintered material according to the second embodiment can include: a "cubic boron nitride powder treatment step" of obtaining a cubic boron nitride source material powder (hereinafter, also referred to as "cBN source material powder") by attaching fine cubic boron nitride particles (hereinafter, also referred to as "fine cBN particles") to coarse cubic boron nitride particles (hereinafter, also referred to as "coarse cBN particles"); a "powder mixture formation step" of preparing a powder mixture by mixing the cubic boron nitride source material powder and a binder source material powder including WC, Co and Al; and a "sintering step" of obtaining the cubic boron nitride sintered material by sintering the powder mixture.

(Cubic Boron Nitride Powder Treatment Step)

The coarse cubic boron nitride powder (having an average particle size of 0.2 to 8 μm; hereinafter, also referred to as "coarse cBN powder") and the fine cBN powder (having an average particle size of 0.05 to 0.1 μm; hereinafter, referred to as "fine cBN powder") are prepared. A volume ratio of the fine cBN powder and the coarse cBN powder can fall within a range of 20:80 to 1:99.

(Electrostatic Adsorption)

A reagent PSS (poly(diallyldimethylammonium chloride)) is added to the fine cBN powder, which is then left for 30 minutes. A reagent PDDA (poly(sodium 4-styrenesulfonate)) is added to the coarse cBN powder, which is then left for 30 minutes. Thereafter, the fine cBN powder and the coarse cBN powder are cleaned and then are mixed with each other using a planetary mill for 10 minutes, thereby obtaining a mixed slurry. The mixed slurry is left for 24 hours for the purpose of drying, thereby obtaining the cBN source material powder.

In the obtained cBN source material powder, the fine cBN particles are attached to the surfaces of the coarse cBN particles by electrostatic adsorption. Since the fine cBN particles each having excellent sinterability exist between the coarse cBN particles, binding force between the coarse cBN particles is increased when sintering the cBN source material powder. Therefore, the obtained cBN sintered material can have high hardness even after the acid treatment.

(Ion implantation)

Ion implantation can be performed onto the cBN source material powder obtained by the electrostatic adsorption. In the ion implantation, for example, ion irradiation is performed using an ion implantation device ("SHX-II" (trademark) manufactured by Sumitomo Heavy Industries) at an energy of 0.2 to 60 KeV. Examples of ions usable herein include cobalt ions, calcium ions, nickel ions, iron ions, aluminum ions, and the like.

By performing the ion irradiation to add an element to the surfaces of the cBN particles, a small amount of an oxide layer existing on each of the surfaces of the cBN particles and a bond (B—N bond) between boron and nitrogen on each of the surfaces of the cBN particles become unstable. This promotes dissolution and re-precipitation caused by cobalt or the like in the below-described sintering step, thus resulting in further increased binding force between the coarse cBN particles. Therefore, the obtained cBN sintered material can have high hardness even after the acid treatment.

(Ammonia Treatment)

Ammonia treatment can be performed onto the cBN source material powder obtained by the electrostatic adsorption. In the ammonia treatment, for example, the cBN source material powder is introduced into an ammonia atmosphere heated to 100 to 1400° C. and is left for 30 to 540 minutes.

By performing the ammonia treatment for a long time, oxygen on the surfaces of the cBN particles is decomposed and nitrogen (N) and hydrogen (H) can be expected to be modified in the atomic level on the surfaces of the cBN particles, thus further promoting binding between the cBN particles in the below-described sintering step. Therefore, the obtained cBN sintered material can have high hardness and high bending test strength even after the acid treatment.

(Powder Mixture Formation Step)

The powder mixture of the cBN source material powder obtained as above and the binder source material powder including WC, Co and Al is formed. The binder source material powder is a source material for the binder of the cubic boron nitride sintered material.

The binder source material powder can be prepared as follows. First, WC powder, Co powder, and Al powder are prepared. Next, the powders are mixed at a predetermined ratio and are subjected to heat treatment (for example, 1200° C.) in vacuum, thereby forming an intermetallic compound. The intermetallic compound is pulverized by a wet ball mill, a wet bead mill, or the like, thereby preparing the binder source material powder including WC, Co, and Al. It should be noted that the method of mixing the powders is not particularly limited; however, in order to efficiently and uniformly mix the powders, ball mill mixing, bead mill mixing, planetary mill mixing, jet mill mixing, or the like is preferable. Each of the mixing methods may be performed in a wet manner or dry manner.

The cBN source material powder and the binder source material powder are preferably mixed by wet ball mill mixing employing ethanol, acetone or the like as a solvent. After the mixing, the solvent is removed by natural drying. Then, an impurity such as moisture on the surfaces thereof is preferably removed by heat treatment (for example, at more than or equal to 850° C. in vacuum).

The binder source material powder may include other element(s) in addition to WC, Co, and Al. Suitable examples of the other element(s) include Ni, Fe, Cr, Mn, Ti, V, Zr, Nb, Mo, Hf, Ta, Re, and the like.

(Sintering Step)

The powder mixture Obtained as above is introduced into a container, and is then vacuum-sealed. A vacuum sealing temperature is preferably more than Or equal to 850° C. This is a temperature of more than the inciting point of the sealing material.

Next, the vacuum-sealed powder mixture is sintered using an ultra-high temperature and high pressure apparatus, thereby obtaining the cubic boron nitride sintered material. Sintering conditions are not particularly limited. For example, the sintering can be performed for 15 minutes under a pressure of 4.5 to 10 GPa and a temperature of more than or equal to 1200° C. and less than or equal to 1900° C.

When the high pressure and high temperature are applied to the powder mixture during the sintering and the pressure is then repeatedly changed from a low pressure to a high pressure, the surfaces of the cBN particles are chipped, with the result that a newly generated surface having high activity appears to result in increased binding force between the cBN particles. This effect is particularly noticeable when the fine cBN particles are attached to the coarse cBN particles by the electrostatic adsorption. Therefore, the obtained cBN sintered material can have high hardness and high thermal diffusivity even after the acid treatment.

EXAMPLES

The following describes the present embodiment more specifically by way of examples. However, the present embodiment is not limited by these examples.

Example 1

<Sample 1-1>
(Powder Mixture Formation Step)

A binder source material powder is prepared. WC powder, Co powder, and Al powder were prepared, and were blended at the following ratio: WC:Co:Al=43:40:17 in weight % it should be noted that the average particle size of each powder was 2 µm. The mixture was made uniform by performing heat treatment (at 950° C. for 30 minutes in vacuum), and was then finely pulverized using a carbide ball mill. In this way, a hinder source material powder having an average particle size of 1 µm was obtained.

A cBN source powder (average particle size of 1 µm) and the binder source material powder were blended at the following ratio: the cBN source powder:the binder source material powder=95:5 in volume %. Then, they were mixed uniformly by a wet ball mill method using ethanol. Then, degassing heat treatment was performed onto the mixed powders at 900° C. in vacuum to remove an impurity such as moisture on the surfaces thereof. In this way, a powder mixture was formed.

(Sintering Step)

Next, the obtained powder mixture was sintered to form a cubic boron nitride sintered material. Specifically, the powder mixture was introduced into a container composed of Ta with the powder mixture being in contact with a WC-6% Co cemented carbide disc, and was vacuum-sealed. This powder mixture was sintered at 7.0 GPa and 1700° C. for 15 minutes using a belt-type ultra-high pressure and high temperature generating apparatus. In this way, the cubic boron nitride sintered material was formed.

<Sample 1-2>
(cBN Powder Treatment Step)

First, a cBN source material powder was formed. Coarse cBN powder (average particle size of 1 µm) and fine cBN powder (average particle size of 0.1 µm) were prepared at the following volume ratio: the coarse cBN powder:the fine cBN powder=8:1.

Reagent PSS was added to the fine cBN powder, which was then left for 30 minutes. Reagent PDDA was added to the coarse cBN powder which was then left for 30 minutes. Thereafter, the fine cBN powder and the coarse cBN powder were cleaned and were then mixed by a planetary mill for 10 minutes, thereby obtaining a mixed slurry. The mixed slurry was left for 24 hours for the purpose of drying, thereby obtaining the cBN source material powder.

When the obtained cBN source material powder was observed by an SEM, it was confirmed that the fine cBN particles were attached (electrostatically adsorbed) to the surfaces of the coarse cBN particles.

(Powder Mixture Formation Step)

Next, a binder source material powder is prepared. WC powder, Co powder, and Al powder were prepared, and were blended at the following ratio: WC:Co:Al=43:40:17 in weight %. It should be noted that the average particle size of each powder was 2 µm. The mixture was made uniform by heat treatment (at 950° C. for 30 minutes in vacuum), and was then finely pulverized using a carbide ball mill. In this way, a binder source material powder having an average particle size of 1 µm was obtained.

The cBN source material powder and the binder source material powder were blended at the following ratio: the cBN source material powder:the binder source material powder=95:5 in volume %. Then, they were uniformly mixed by a wet ball mill method using ethanol. Thereafter, degassing heat treatment was performed onto the mixed powders at 900° C. in vacuum to remove an impurity such as moisture on the surfaces thereof. When the cBN source material powder after the heat treatment was observed by a SEM, it was confirmed that the fine cBN particles were attached to the surfaces of the coarse cBN particles. In this way, a powder mixture was formed.

(Sintering Step)

Next, the obtained powder mixture was sintered to form a cubic boron nitride sintered material. Specifically, the powder mixture was introduced into a container composed of Ta with the powder mixture being in contact with a WC-6% Co cemented carbide disc, and was vacuum-sealed. This powder mixture was sintered at 7.0 GPa and 1700° C. for 15 minutes using a belt-type ultra-high pressure and high temperature generating apparatus. In this way, the cubic boron nitride sintered material was formed.

<Sample 1-3>

In a sample 1-3, a cubic boron nitride sintered material was formed in the same manner as in sample 1-2 except for the following points.

The volume ratio of the coarse cBN powder and the fine cBN powder in the "cBN powder treatment step" was set as described in the column "Coarse Particles:Fine Particles (Volume Ratio)" of the "Electrostatic Adsorption" of the "cBN Powder Treatment" in Table 1.

The cBN source material powder and the binder source material powder were blended at the following ratio: the cBN source material powder:the binder source material powder=80:20 in volume %.

<Sample 1-11>

A cubic boron nitride sintered material was formed in the same manner as in sample 1-3 except that the cBN source material powder and the binder source material powder were blended at the following ratio: the cBN source material powder:the binder source material powder=97:3 in volume %.

<Sample 1-12>

A cubic boron nitride sintered material was formed in the same manner as in sample 1-3 except that the cBN source material powder and the binder source material powder were blended at the following ratio: the cBN source material powder:the binder source material powder=65:35 in volume %.

<Samples 1-4, 1-5, and 1-13 to 1-19>

In each of samples 1-4, 1-5, and 1-13 to 1-19, a cubic boron nitride sintered material was formed in the same manner as in sample 1-2 except for the following points.

The volume ratio of the coarse cBN powder and the fine cBN powder in the "cBN powder treatment step" was set as described in the column "Coarse Particles:Fine Particles (Volume Ratio)" of the "Electrostatic Adsorption" of the "cBN Powder Treatment" in Table 1.

The pressure in the "sintering step" was set as described in the column "Pressure (GPa)" of the "Sintering Step" in Table 1.

The average particle size of the coarse cBN powder was set as described in the column "Coarse cBN Particle Size (μm)" of the "Source Material" in Table 1.

<Samples 1-6 to 1-10>

Each of cubic boron nitride sintered materials of samples 1-6 to 1-10 was formed in the same manner as in sample 1-2 except for the following point.

The "cBN powder treatment step" was performed in the following procedure. The coarse cBN powder (average particle size of 1 μm) and the fine cBN powder (average particle size of 0.1 μm) were prepared at the following volume ratio: the coarse cBN powder and the fine cBN powder=8:1.

Reagent PSS was added to the fine cBN powder, which was then left for 30 minutes. Reagent PDDA was added to the coarse cBN powder, which was then left for 30 minutes. Thereafter, the fine cBN powder and the coarse cBN powder were cleaned, and were then mixed by a planetary mill for 10 minutes, thereby obtaining a mixed slurry. The mixed slurry was left for 24 hours for the purpose of drying, thereby obtaining a cBN source material powder.

The obtained cBN source material powder was irradiated, at an energy of 100 KeV by an ion implantation apparatus, with an element described in the column "Implanted Element" of the "Ion Implantation" of the "cBN Powder Treatment" in Table 1. For example, in sample 1-6, the cBN source material powder was irradiated with cobalt (Co).

When the cBN source material powder after the irradiation was observed by a TEM-EELS, it was confirmed that the fine cBN particles were attached (electrostatically adsorbed) to the surfaces of the coarse cBN particles and that Co existed in the vicinity of the surfaces.

<Sample 1-20>

A cubic boron nitride sintered material of a sample 1-20 was formed in the same manner as in sample 1-4 except for the following point.

In the "powder mixture formation step", the cBN source material powder and the binder source material powder were blended at the following ratio: the cBN source material powder:the binder source material powder=60:40.

<Sample 1-21>

A cubic boron nitride sintered material of a sample 1-21 was formed in the same manner as in sample 1-4 except for the following points.

In the "powder mixture formation step", the cBN source material powder and the binder source material powder were blended at the following ratio: the cBN source material powder:the binder source material powder=97:3.

In the "sintering step", sintering was performed without using a cemented carbide disc.

<Evaluation>

(Content Ratio of Cubic Boron Nitride)

The content ratio of the cubic boron nitride in each of the cubic boron nitride sintered materials was measured using a SEM. A specific measurement method has been described in the first embodiment, and therefore will not be described repeatedly. Results thereof are shown in the column "cBN Content Ratio (Volume %)" of the "cBN Sintered Material" in Table 1.

In each of samples 1-1 to 1-19, the ratio of the cubic boron nitride in the cubic boron nitride sintered material is smaller than the ratio of the cBN source material powder in the powder mixture. In each of these samples, sintering is performed with the powder mixture being in contact with the cemented carbide disc in the sintering step. Therefore, it is presumed that the cemented carbide component flew into the powder mixture during the sintering to change the mixture ratio of the cBN source material powder in the powder mixture, thus resulting in the ratio shown in Table 1.

<Composition of Binder>

A specimen having a length of 6 mm, a width of 3 mm, and a thickness of 0.45 to 0.50 mm was cut from each of the cubic boron nitride sintered materials, and XRD analysis was performed onto the specimen. Next, each specimen was immersed in hydrofluoric-nitric acid (acid mixture with concentrated nitric acid (60%):distilled water:concentrated hydrofluoric acid (47%)=2:2:1 at a volume ratio) at 140° C. for 48 hours within a sealed container, thereby obtaining an acid-treated solution having the binder dissolved therein. The acid-treated solution was subjected to ICP analysis. The composition of the binder was specified in accordance with the results of XRD analysis and ICP analysis.

It was confirmed that at least WC, Co, and an Al compound existed in each of all the samples. It should be noted that no distinct peak was detected in XRD with regard to the Al compound. This is presumably due to the following reason: since a Cu ray source was used in the XRD apparatus, background noise due to Co was large, with the result that a small amount of Al compound could not be detected.

<Hardness>

Hardness Hb (GPa) of each cubic boron nitride sintered material before the acid treatment was measured. Hardness Ha (GPa) of each cubic boron nitride sintered material after the acid treatment was measured. Specific measurement methods has been described in the first embodiment, and therefore will not be described repeatedly. Ha/Hb of each sample was calculated based on Ha and Hb. Results thereof are shown in the column "Ha/Hb" of the "cBN Sintered Material" in Table 1.

It should be noted that when X2/X1 described above was measured in each of the measurement samples (cubic boron nitride sintered materials) after the acid treatment, X2/X1 was less than or equal to 0.09 in each of all the measurement samples, thus confirming that the binder in the cubic boron nitride sintered material had been substantially removed. Details of the measurement method for X2/X1 have been described in the first embodiment, and therefore will not be described repeatedly.

<Cutting Test: Sintered Alloy Cutting>

A cutting tool (substrate shape: TNGA160404; cutting edge treatment: T01225) was formed using each of the formed cubic boron nitride sintered materials. A cutting test was performed using this cutting tool under the following cutting conditions.

Cutting speed: 180 m/min.

Feeding speed: 0.1 min/rev.

Depth of cut: 0.2 mm

Coolant: DRY

Cutting method: end surface continuous cutting

Lathe: LB4000 (manufactured by OKUMA Corporation)

Wort piece: cylindrical sintered part (end surface cut of sintered alloy D-40 manufactured by Sumitomo Electric Sintered Alloy: HRB75)

Evaluation method: The cutting edge was observed per cutting distance of 0.1 km to measure a flank wear amount. A cutting distance when the maximum flank wear amount became more than or equal to 200 μm was measured. The cutting distance at a value of 200 μm was read in a graph obtained by plotting a cutting distance in km for the horizontal axis and plotting a maximum flank wear amount for the vertical axis in each sample and by interpolating the plots with a straight line. It is indicated that as the cutting distance is longer, the tool life is longer. Results thereof are shown in the column "Cutting Distance (km)" of the "Cutting Test" in Table 1.

TABLE 1

| | cBN Powder Treatment | | | Sintering | cBN Sintered Material | | Cutting Test |
|---|---|---|---|---|---|---|---|
| | Source Material | Electrostatic Adsorption Coarse | Ion | | | | |
| Sample No. | Coarse cBN Particle Size (μm) | Particles:Fine Particles (Volume Ratio) | Implantation Implanted Element | Step Pressure (GPa) | cBN Content Ratio (Volume %) | Ha/Hb | Cutting Distance (km) |
| 1-1 | 1 | Coarse Particles 100% | — | 7.0 | 90 | 0.35 | 1.5 |
| 1-2 | 1 | 8:1 | — | 7.0 | 90 | 0.42 | 4.0 |
| 1-3 | 1 | 12:1 | — | 7.0 | 85 | 0.54 | 4.5 |
| 1-4 | 1 | 12:1 | — | 7.0 | 90 | 0.58 | 5.5 |
| 1-5 | 1 | 18:1 | — | 7.0 | 90 | 0.54 | 4.8 |
| 1-6 | 1 | 8:1 | Co | 7.0 | 90 | 0.53 | 4.6 |
| 1-7 | 1 | 8:1 | Ca | 7.0 | 90 | 0.54 | 4.7 |
| 1-8 | 1 | 8:1 | Ni | 7.0 | 90 | 0.55 | 4.5 |
| 1-9 | 1 | 8:1 | Fe | 7.0 | 90 | 0.54 | 4.3 |
| 1-10 | 1 | 8:1 | Al | 7.0 | 90 | 0.5 | 4.3 |
| 1-11 | 1 | 12:1 | — | 7.0 | 96 | 0.6 | 4.1 |
| 1-12 | 1 | 12:1 | — | 7.0 | 80 | 0.5 | 4.3 |
| 1-13 | 0.2 | 12:1 | — | 7.0 | 90 | 0.58 | 5.2 |
| 1-14 | 0.4 | 12:1 | — | 7.0 | 90 | 0.58 | 5.3 |
| 1-15 | 0.5 | 12:1 | — | 7.0 | 90 | 0.58 | 5.4 |
| 1-16 | 2 | 12:1 | — | 7.0 | 90 | 0.58 | 5.5 |
| 1-17 | 3.5 | 12:1 | — | 7.0 | 90 | 0.58 | 5.4 |
| 1-18 | 5 | 12:1 | — | 7.0 | 90 | 0.58 | 5.3 |
| 1-19 | 8 | 12:1 | — | 7.0 | 90 | 0.58 | 5.2 |
| 1-20 | 1 | 12:1 | — | 7.0 | 75 | 0.35 | 1.0 |
| 1-21 | 1 | 12:1 | — | 7.0 | 97 | 0.6 | 1.6 |

<Analysis>

Samples 1-1, 1-20, and 1-21 correspond to comparative examples. Samples 1-12 to 1-19 correspond to examples of the present disclosure. It was confirmed that the tool life of each of samples 1-1 to 1-19 (examples of the present disclosure) is longer than that of each of samples 1-1, 1-20, and 1-21 (comparative examples).

Example 2

<Sample 2-1>

In sample 2-1, a cubic boron nitride sintered material was formed in the same manner as in sample 1-4.

<Samples 2-2 to 2-5>

In each of samples 2-2 to 2-5, a cubic boron nitride sintered material was formed in the same manner as in sample 2-1 except for the following point.

In the "sintering step", pressure was applied up to 7 GPa and then heating was performed up to 1700° C. Thereafter, during a sintering time of 15 minutes, the pressure was changed as described in "Applied Pressure Profile (GPa)" of "Sintering Step" in Table 2. For example, in sample 2-2, the pressure was changed during the sintering time of 15 minutes as follows: 7 GPa→6 GPa→7 GPa.

<Sample 2-6>

A cubic boron nitride sintered material was formed in the same manner as in sample 2-5 except that the cBN source material powder and the binder source material powder were blended at the following ratio: the cBN source material powder:the binder source material powder 80:20 in volume %.

<Sample 2-7>

A cubic boron nitride sintered material was formed in the same manner as in sample 2-5 except that the cBN source material powder and the binder source material powder were blended at the following ratio: the cBN source material powder:the binder source material powder=65:35 in volume %.

<Sample 2-8>

A cubic boron nitride sintered material was formed in the same manner as in sample 2-5 except that the cBN source material powder and the binder source material powder were blended at the following ratio the cBN source material powder:the binder source material powder=97:3 in volume %.

<Evaluation>

The content ratio of the cubic boron nitride, the composition of the binder, and the hardness in each of the cubic boron nitride sintered materials were measured. The respective measurement methods are the same as those in the first embodiment, and therefore will not be described repeatedly.

The content ratio of the cubic boron nitride in each sample is shown in the column "cBN Content Ratio (Volume %)" of the "cBN Sintered Material" in Table 2.

It was confirmed that at least WC, Co, and an Al compound existed in the composition of the binder of each of all the samples. Since no distinct peak was detected in XRD with regard to the Al compound, it was presumed that the Al compound was a composite compound composed of a plurality of Al compounds.

Ha/Hb of each sample is shown in the column "HA/Hb" of the "cBN Sintered Material" in Table 2.

<Thermal Diffusivity>

Thermal diffusivity Kb ($mm^2$/s) of each of the cubic boron nitride sintered materials before the acid treatment was measured. Thermal diffusivity Ka ($mm^2$/s) of each of the cubic boron nitride sintered materials after the acid treatment was measured. Specific measurement methods have been described in the first embodiment, and therefore will not be described repeatedly. Ka/Kb of each sample was calculated based on Ka and Kb. Results thereof are shown in the column "Ka/Kb" of the "cBN Sintered Material" in Table 2.

It should be noted that when X2/X1 was measured in each of the measurement samples (cubic boron nitride sintered materials) after the acid treatment, X2/X1 was less than or equal to 0.09 in each of all the measurement samples, thus confirming that the binder in the cubic boron nitride sintered material had been substantially removed. Details of the measurement method for X2/X1 have been described in the first embodiment, and therefore will not be described repeatedly.

<Cutting Test: Evaluation on Cast Iron Milling (Remained WET)>

A cutting tool (substrate shape: SNGN090308LE, holder: RM3080R, SNGN090308; cutting edge treatment: T01225) was formed using each of the formed cubic boron nitride sintered materials. A cutting test was performed using this cutting tool under the following cutting conditions.

Cutting speed: 1000 m/min.
Feeding speed: 0.15 mm/rev.
Depth of cut: 0.4 mm
Coolant: emulsion 96 diluted with water by 20×
Facility: NEXUS 530C-II HS (manufactured by Yamazaki Mazak)
Workpiece: simultaneous processing of two FC250 perlite plates Evaluation method: The cutting edge was checked per 20 passes. It was determined that the tool life was reached when chipping or breakage of more than or equal to 100 μm occurred. A removed volume per pass was calculated as follows: the amount of depth of cut (0.4 mm=0.0004 cm)× the area (cm$^2$) of the cut surface of the cut surface of the workpiece×2 (plates). It is indicated that as the removed volume is larger, the tool life is longer. Results thereof are shown in the column "Removed Volume (cm$^3$)" of the "Cutting Test" in Table 2.

<Samples 3-2 to 3-6>

In each of samples 3-2 to 3-6, a cubic boron nitride sintered material was formed in the same manner as in sample 3-1 except for the following points.

In the "cBN powder treatment step", ammonia treatment was performed onto the cBN source material powder obtained by the electrostatic adsorption. The temperature and time of the ammonia treatment are shown in the column "Temperature and Time" of the "Ammonia Treatment" in Table 3.

The pressure in the "سintering step" was set as described in the column "Pressure (GPa)" of the "Sintering Step" in Table 3.

<Sample 3-7>

A cubic boron nitride sintered material was formed in the same manner as in sample 3-6 except that the cBN source material powder and the binder source material powder were blended at the following ratio: the cBN source material powder:the binder source material powder=80:20 in volume %.

<Sample 3-8>

A cubic boron nitride sintered material was formed in the same manner as in sample 3-6 except that the cBN source material powder and the binder source material powder were blended at the following ratio: the cBN source material powder:the binder source material powder=65:35 in volume %.

<Sample 3-9>

A cubic boron nitride sintered material was formed in the same manner as in sample 3-6 except that the cBN source material powder and the binder source material powder were

TABLE 2

| Sample No. | cBN Powder Treatment Electrostatic Adsorption Coarse Particles:Fine Particles (Volume Ratio) | Sintering Step Applied Pressure Profile (GPa) | cBN Sintered Material cBN Content Ratio (Volume %) | Ha/Hb | Ka/Kb | Cutting Test Removed Volume (cm$^3$) |
|---|---|---|---|---|---|---|
| 2-1 | 12:1 | 7 | 90 | 0.58 | 0.55 | 450.0 |
| 2-2 | 12:1 | 7→6→7 | 90 | 0.58 | 0.6 | 640.0 |
| 2-3 | 12:1 | 7→5→7 | 90 | 0.58 | 0.85 | 644.0 |
| 2-4 | 12:1 | 7→5→7→5→7 | 90 | 0.58 | 0.9 | 660.0 |
| 2-5 | 12:1 | 7→5→7→5→7→5→7 | 90 | 0.58 | 0.95 | 699.0 |
| 2-6 | 12:1 | 7→5→7→5→7→5→7 | 85 | 0.58 | 0.93 | 670.0 |
| 2-7 | 12:1 | 7→5→7→5→7→5→7 | 80 | 0.58 | 0.9 | 500.0 |
| 2-8 | 12:1 | 7→5→7→5→7→5→7 | 96 | 0.58 | 0.96 | 600.0 |

<Analysis>

Samples 2-1 to 2-8 correspond to examples of the present disclosure, and were each confirmed to attain a long tool life.

It was confirmed that among these, each of samples 2-2 to 2-8 satisfies Ka/Kb≥0.60 and attains a particularly long tool life. This is presumably due to the following reason: in each of these samples, the pressure was repeatedly changed from a high pressure to a low pressure in the sintering step, with the result that the fine cBN particles attached to the coarse cBN particles by the electrostatic adsorption promote binding between the coarse cBN particles.

Example 3

<Sample 3-1>

In sample 3-1, a cubic boron nitride sintered material was formed in the same manner as in sample 1-4.

blended at the following ratio: the cBN source material powder:the binder source material powder=97:3 in volume %.

<Evaluation>

The content ratio of the cubic boron nitride, the composition of the binder, and the hardness in each of the cubic boron nitride sintered materials were measured. The respective measurement methods were the same as those in the first embodiment, and therefore will not be described repeatedly.

The content ratio of the cubic boron nitride in each sample is shown in the column "cBN Content Ratio (Volume %)" of the "cBN Sintered Material" in Table 3.

It was confirmed that at least WC, Co, and an Al compound existed in the composition of the binder of each of all the samples. Since no distinct peak was detected in XRD with regard to the Al compound, it was presumed that the Al compound was a composite compound composed of a plurality of Al compounds.

Ha/Hb of each sample is shown in the column "Ha/Hb" of the "cBN Sintered Material" in Table 3.

<Bending Test Strength>

Bending test strength Tb (GPa) of each of the cubic boron nitride sintered materials before the acid treatment was measured. Bending test strength Ta (GPa) of each of the cubic boron nitride sintered materials after the acid treatment was measured. The specific measurement methods have been described in the first embodiment, and therefore will not be described repeatedly. Ta/Tb of each sample was calculated based on Ta and Tb. Results thereof are shown in the column "Ta/Tb" of the "cBN Sintered Material" in Table 3.

It should be noted that when X2/X1 was measured in each of the measurement samples (cubic boron nitride sintered materials) after the acid treatment, X2/X1 was less than or equal to 0.09 in each of all the measurement samples, thus confirming that the binder in the cubic boron nitride sintered material had been substantially removed. Details of the measurement method for X2/X1 have been described in the first embodiment, and therefore will not be described repeatedly.

<Cutting Test: Cutting of High-Strength Sintered Alloy>

A cutting tool (substrate shape: CNGA120408; cutting edge treatment: T01225) was formed using each of the formed cBN sintered materials. A cutting test was performed using this cutting tool under the following cutting conditions.

Cutting speed: 170 m/min.
Feeding speed: 0.1 mm/rev.
Depth of cut: 0.13 mm
Coolant: DRY
Cutting method: end surface intermittent cutting
Lathe: LB4000 (manufactured by OKUMA Corporation)
Workpiece: sprocket (end surface cut of sintered alloy DM-50 (quenched) manufactured by Sumitomo Electric Sintered HV440)

Evaluation method: The cutting edge was observed per 0.5 km to measure a flank wear amount. A cutting distance when a breakage width of the flank face became more than or equal to 100 μm was measured. It is indicated that as the cutting; distance is longer, the tool life is longer. Results thereof are shown in the column "Cutting Distance (km)" of the "Cutting Test" in Table 3.

<Analysis>

Samples 3-1 to 3-9 correspond to examples of the present disclosure, and were each confirmed to attain a long tool life.

It was confirmed that among these, each of samples 3-4 to 3-9 satisfies Ta/Tb≥0.35 and attains a particularly long tool life. This is presumably due to the following reason: since the ammonia treatment time is long, oxygen on the cBN surfaces are further decreased, thus resulting in improved binding force between the cBN particles.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A cubic boron nitride sintered material comprising:
   more than or equal to 80 volume % and less than or equal to 96 volume % of cubic boron nitride grains; and
   a binder, wherein
   the binder includes tungsten carbide, cobalt, and an aluminum compound, and
   Ha/Hb≥0.40 is satisfied, where Hb represents a hardness of the cubic boron nitride sintered material and Ha represents a hardness of the cubic boron nitride sintered material after performing acid treatment onto the cubic boron nitride sintered material to substantially remove the binder in the cubic boron nitride sintered material.

2. The cubic boron nitride sintered material according to claim 1, wherein Ha and Hb satisfy Ha/Hb≥0.53.

3. The cubic boron nitride sintered material according to claim 2, wherein Ha and Hb satisfy Ha/Hb≥0.55.

4. The cubic boron nitride sintered material according to claim 1, wherein Ka/Kb≥0.60 is satisfied, where Kb represents a thermal diffusivity of the cubic boron nitride sintered material before the acid treatment, and Ka represents a thermal diffusivity of the cubic boron nitride sintered material after the acid treatment.

5. The cubic boron nitride sintered material according to claim 4, wherein Ka and Kb satisfy Ka/Kb≥0.90.

TABLE 3

| | | cBN Powder Treatment | | | | | | |
|---|---|---|---|---|---|---|---|---|
| | Source Material | Electrostatic Adsorption Coarse | Ammonia | Sintering | cBN Sintered Material | | | Cutting Test |
| Sample No. | Coarse cBN Particle Size (μm) | Particles:Fine Particles (Volume Ratio) | Treatment Temperature, Time | Step Pressure (GPa) | cBN Content Ratio (Volume %) | Ha/Hb | Ta/Tb | Cutting Life (km) |
| 3-1 | 1 | 12:1 | — | 7.0 | 90 | 0.58 | 0.25 | 2.00 |
| 3-2 | 1 | 12:1 | 200° C., 6 hours | 7.0 | 90 | 0.58 | 0.30 | 2.80 |
| 3-3 | 1 | 12:1 | 400° C., 6 hours | 7.0 | 90 | 0.58 | 0.34 | 3.00 |
| 3-4 | 1 | 12:1 | 600° C., 6 hours | 7.0 | 90 | 0.58 | 0.35 | 3.50 |
| 3-5 | 1 | 12:1 | 900° C., 6 hours | 7.0 | 90 | 0.58 | 0.40 | 3.60 |
| 3-6 | 1 | 12:1 | 900° C., 9 hours | 7.0 | 90 | 0.58 | 0.45 | 4.00 |
| 3-7 | 1 | 12:1 | 900° C., 9 hours | 7.0 | 85 | 0.58 | 0.40 | 3.60 |
| 3-8 | 1 | 12:1 | 900° C., 9 hours | 7.0 | 80 | 0.58 | 0.38 | 3.55 |
| 3-9 | 1 | 12:1 | 900° C., 9 hours | 7.0 | 96 | 0.58 | 0.39 | 3.57 |

6. The cubic boron nitride sintered material according to claim 5, wherein Ka and Kb satisfy Ka/Kb≥0.95.

7. The cubic boron nitride sintered material according to claim 1, wherein Ta/Tb≥0.30 is satisfied, where Tb represents a bending test strength of the cubic boron nitride sintered material before the acid treatment and Ta represents a bending test strength of the cubic boron nitride sintered material after the acid treatment.

8. The cubic boron nitride sintered material according to claim 7, wherein Ta and Tb satisfy Ta/Tb≥0.35.

9. The cubic boron nitride sintered material according to claim 8, wherein Ta and Tb satisfy Ta/Tb≥0.40.

10. The cubic boron nitride sintered material according to claim 1, wherein an average grain size of the cubic boron nitride grains is more than or equal to 0.4 μm and less than or equal to 5 μm.

11. The cubic boron nitride sintered material according to claim 10, wherein the average grain size of the cubic boron nitride grains is more than or equal to 0.5 μm and less than or equal to 3.5 μm.

12. The cubic boron nitride sintered material according to claim 1, wherein the cubic boron nitride sintered material is formed from a powder mixture comprising a cubic boron nitride source material powder including coarse cubic boron nitride particles with fine cubic boron nitride particles attached thereto by electrostatic adsorption.

13. The cubic boron nitride sintered material according to claim 12, wherein the coarse cubic boron nitride particles have an average particle size of 0.2 to 8 μm and the fine cubic boron nitride particles have an average particle size of 0.05 to 0.1 μm.

14. The cubic boron nitride sintered material according to claim 13, wherein a volume ratio of the fine cubic boron nitride particles and the coarse cubic boron nitride particles falls within a range of 20:80 to 1:99.

15. The cubic boron nitride sintered material according to claim 12, wherein the powder mixture further comprises a binder source material powder.

16. The cubic boron nitride sintered material according to claim 14 wherein the binder source material powder comprises tungsten carbide, cobalt, and aluminum.

* * * * *